United States Patent
Yamamoto

(10) Patent No.: US 8,131,874 B2
(45) Date of Patent: Mar. 6, 2012

(54) META DATA CUSTOMIZING METHOD

(75) Inventor: Yohei Yamamoto, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1240 days.

(21) Appl. No.: 11/837,821

(22) Filed: Aug. 13, 2007

(65) Prior Publication Data
US 2008/0046460 A1    Feb. 21, 2008

(30) Foreign Application Priority Data

Aug. 21, 2006  (JP) ................... 2006-224523
Jul. 18, 2007   (JP) ................... 2007-187626

(51) Int. Cl.
*G06F 15/177* (2006.01)

(52) U.S. Cl. ........................ 709/246; 709/231

(58) Field of Classification Search .............. None
See application file for complete search history.

(56) References Cited

U.S. PATENT DOCUMENTS

| | | | | |
|---|---|---|---|---|
| 5,987,480 | A | 11/1999 | Donohue et al. | |
| 7,281,203 | B2* | 10/2007 | Gessner | 715/271 |
| 7,747,083 | B2* | 6/2010 | Tawde | 382/225 |
| 7,797,337 | B2* | 9/2010 | Fry | 707/776 |
| 2004/0225724 | A1* | 11/2004 | Pavlik et al. | 709/219 |
| 2004/0225749 | A1* | 11/2004 | Pavlik et al. | 709/245 |
| 2004/0225959 | A1* | 11/2004 | D'Orto et al. | 715/513 |
| 2006/0028691 | A1 | 2/2006 | Shinomiya | |
| 2007/0027932 | A1* | 2/2007 | Thibeault | 707/200 |
| 2007/0100959 | A1* | 5/2007 | Eichstaedt et al. | 709/217 |
| 2007/0226207 | A1* | 9/2007 | Tawde | 707/5 |
| 2007/0226734 | A1* | 9/2007 | Lin et al. | 717/177 |
| 2007/0245251 | A1* | 10/2007 | Kim et al. | 715/762 |
| 2008/0027953 | A1 | 1/2008 | Morita et al. | |
| 2008/0155118 | A1* | 6/2008 | Glaser et al. | 709/238 |

FOREIGN PATENT DOCUMENTS

| | | | |
|---|---|---|---|
| CN | 1757020 A | | 4/2006 |
| EP | 1014622 A2 | * | 6/2000 |
| GB | 2361156 A | * | 10/2001 |
| JP | 2006-54732 | | 2/2006 |
| WO | WO 9804067 A1 | * | 1/1998 |

OTHER PUBLICATIONS

Ron Roszkiewicz, Metadata in Context, The Seybold Report: Analyzing Publishing Technologies, vol. 4, No. 8, pp. 4-9.*
Ron Roszkiewicz, Metadata in Context, The Seybold Report: Analyzing Publishing Technologies, vol. 4, No. 8, Jul. 2004, pp. 4-9.*

(Continued)

*Primary Examiner* — Patrice Winder
(74) *Attorney, Agent, or Firm* — Oblon, Spivak, McClelland, Maier & Neustadt, L.L.P.

(57) ABSTRACT

A user apparatus makes a meta data obtaining request to a delivering apparatus, the request including designation of an element to customize, which element exists in a predetermined location of a description of the structured language of the meta data to obtain, as well as format designation designating a variable to be located in the element and a format thereof. The delivering apparatus every time dynamically replaces the contents of the corresponding element of the description of the structured language of the meta data to output, with a value corresponding to the variable and the format designated by the format designation, based on the designation of the element and the format designation, according to different requests from respective user apparatuses.

8 Claims, 27 Drawing Sheets

OTHER PUBLICATIONS

Magkanaraki et al., Benchmarking RDF Schemas for the Semantic Web, The Semantic Web—ISWC 2002, Proceedings of First International Conference, p. 132-146.*

J. Gregorio, et al., "The Atom Publishing Protocol ;draft-ietf-atompub-protocol-09.txt", IETF Standard-Working-Draft, Internet Engineering Task Force, IETF, CH, vol. atompub, No. 9, XP015045227, ISSN: 0000-0004, Jun. 23, 2006, 41 pages.

* cited by examiner

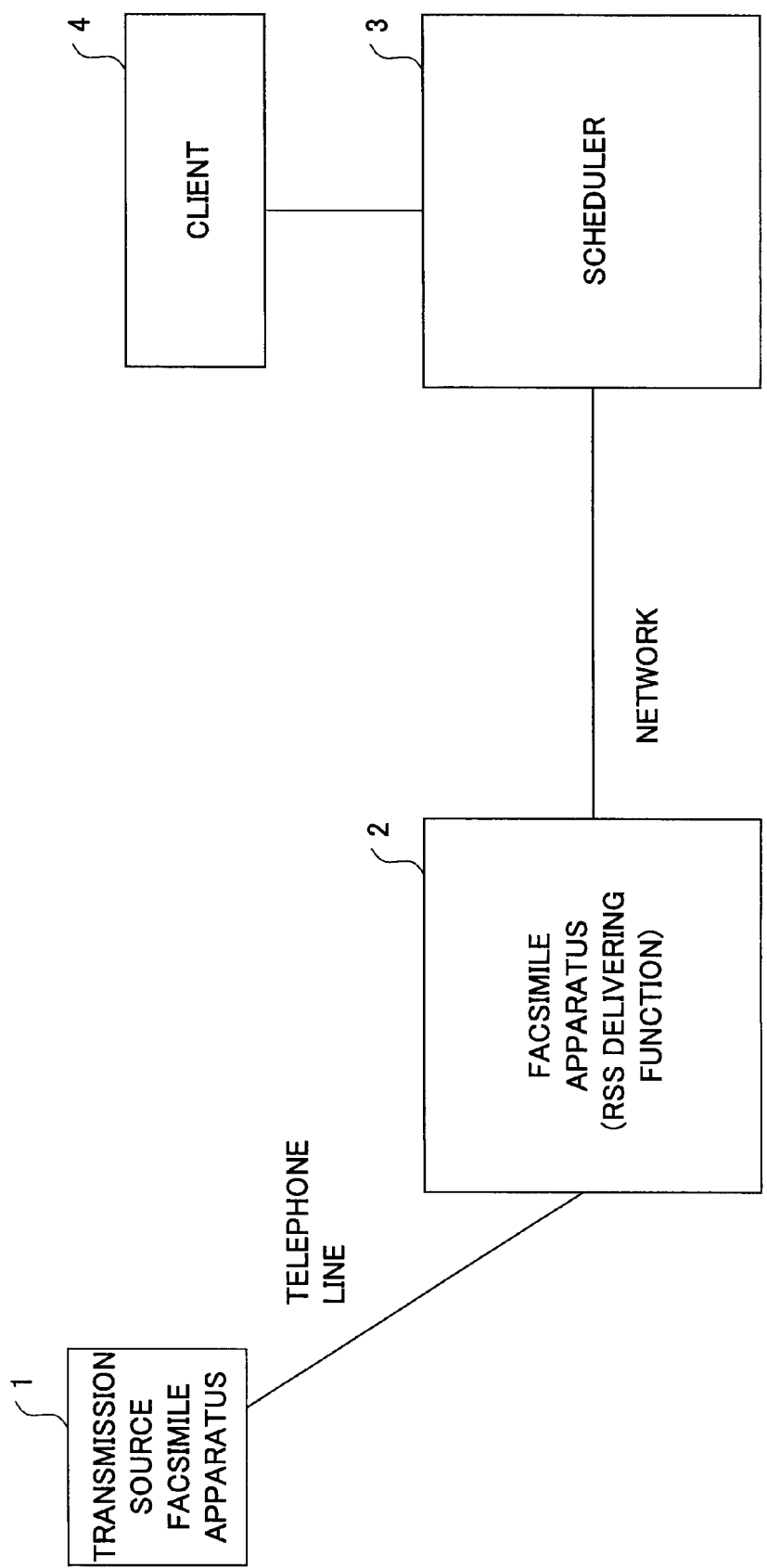

FIG.2

```
<rss version="2.0"
    xmlns:atom10="http://www.w3.org/2005/Atom" >
<channel>
   <title>COMMUNICATION HISTORY</title>
   <link>http://mfp.example.co.jp/fax/</link>
   <description>MFP LOCATED IN 2F WINDOW SIDE</description>
   <language>ja</language>
   <managingEditor>admin@src.ricoh.co.jp</managingEditor>
   <lastBuildDate>Thu, 15 Dec 2005 17:07:24 PST</lastBuildDate>
   <category>COMMUNICATION HISTORY</category>
   <generator>Imagio AIO MF-1</generator>
   <image>
     <title>COMMUNICATION HISTORY</title>
     <width>100</width>
     <height>50</height>
     <url>http://mfp.example.co.jp/image/fax.png</url>
     <link>http://mfp.example.co.jp/fax/</link>
   </image>
   <atom10:link rel="self" href="http://mfp.example.co.jp/rss/fax/"
/>
   <atom10:icon>http://mfp.example.co.jp/favicon.ico</atom10:icon>
   <item>
      <title>FACSIMILE RECEPTION: 03-1234-5678</title>
      <link>http://mfp.example.co.jp/fax/2</link>
      <description><![CDATA[<dl>
<dt>DATE/TIME</dt>
<dd>Thu, 11 Apr 2006 12:08:21 PST</dd>
<dt>DESTINATION</dt>
<dd>03-1234-5678</dd>
<dt>LINE</dt>
<dd>G3</dd>
<dt>NUMBER OF SHEETS</dt>
<dd>7</dd>
<dt>RESULT</dt>
<dd>RECEPTION COMPLETION</dd>
<dt>USER NAME</dt>
<dd>---</dd>
<dt>DOCUMENT NUMBER</dt>
<dd>2</dd>
</dl>]]></description>
      <category>FACSIMILE RECEPTION</category>
      <guid>http://mfp.example.co.jp/fax/2</guid>
      <pubDate>Thu, 11 Apr 2006 12:08:21 PST</pubDate>
   </item>
                   ⋮
</channel>
</rss>
```

D1 marks the `<item>` block.

FIG.3

(a) WEEK VIEW

| SUN | MON | TUE | WED | THU | FRI | SAT |
|---|---|---|---|---|---|---|
| 10:23<br>ABC COM-PANY | 11:10<br>○×LIB-RARY 10 | | | | | |
| 13:45<br>ADMINIST-RATIVE DEPT. | | | | | | |
| 14:44<br>ACCOUN-TING DEPT. | | | | | | |

(b) DAY VIEW

| |
|---|
| 10:23 ABC COMPANY |
| |
| |
| 13:45 ADMINISTRATIVE DEPT. |
| 14:44 ACCOUNTING DEPT. |
| |
| |
| |

FIG.4

DAY VIEW

| |
|---|
| 10:23 10:23 ABC COMPANY |
| |
| |
| 13:45 13:45 ADMINISTRATIVE DEPT. |
| 14:44 14:44 ACCOUNTING DEPT. |
| |
| |
| |
| |

FIG.7

| Id | RECEPTION DATE | TRANSMISSION SOURCE | TYPE | PAGE NUMBER | DOCUMENT ID |
|---|---|---|---|---|---|
| 1 | 2006/1/1 1:1:1 | 03-1234-5678 | G3 | 3 | 1 |
| 2 | 2006/1/2 10:2:3 | 055-223-3445 | G4 | 2 | 2 |
| 3 | 2006/1/2 13:22:1 | 011-222-3333 | G4 | 2 | 3 |

FIG.8

| DOCUMENT ID | FILE |
|---|---|
| 1 | /faxdata/0001.pdf |
| 2 | /faxdata/0002.pdf |
| 3 | /faxdata/0003.pdf |

```
<item>
    <title>FACSIMILE RECEPTION:  <%-sender_no%></title>
    <link><%-url_fax_rcpt%></link>
    <description><![CDATA[<dl>
<dt>DATE/TIME</dt>
<dd><%-fax_rcpt_dates%></dd>
<dt>DESTINATION</dt>
<dd><%-from%></dd>
<dt>LINE</dt>
<dd> <%-fax_rcpt_lines%> </dd>
<dt>NUMBER OF SHEETS</dt>
<dd> <%-fax_rcpt_pages%> </dd>
<dt>RESULT</dt>
<dd> <%-fax_rcpt_results%> </dd>
<dt>USER NAME</dt>
<dd> <%-fax_rcpt_users%> </dd>
<dt>DOCUMENT NUMBER</dt>
<dd> <%-fax_rcpt_numbers%> </dd>
</dl>]]></description>
    <category>FACSIMILE RECEPTION</category>
    <guid> <%-url_fax_rcpt%> </guid>
    <pubDate> <%-fax_rcpt_dates%> </pubDate>
   </item>
```

FIG.15

REQUEST

| FIXED  TEMPLATE | XPATH PART | FORMAT PART |

GET /fax?template-id=2&/rss/channel/item/title=<%sender_no%> HTTP/1.1
Host: fax.server.com

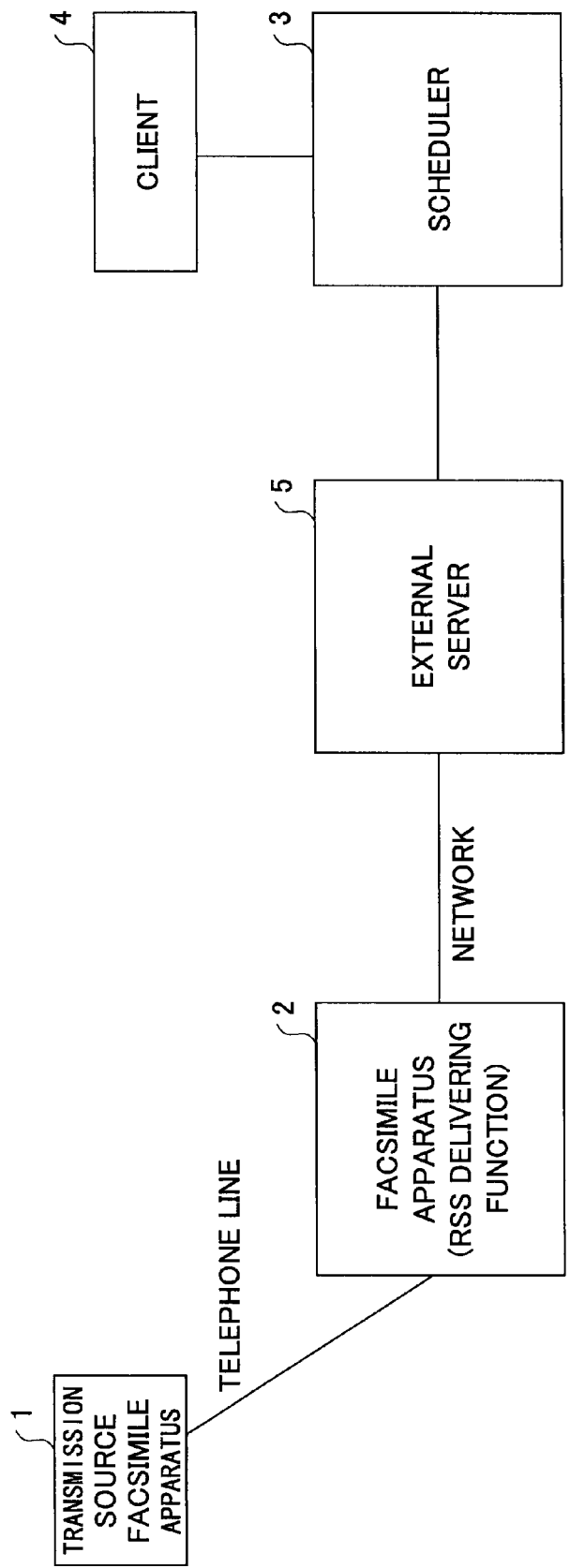

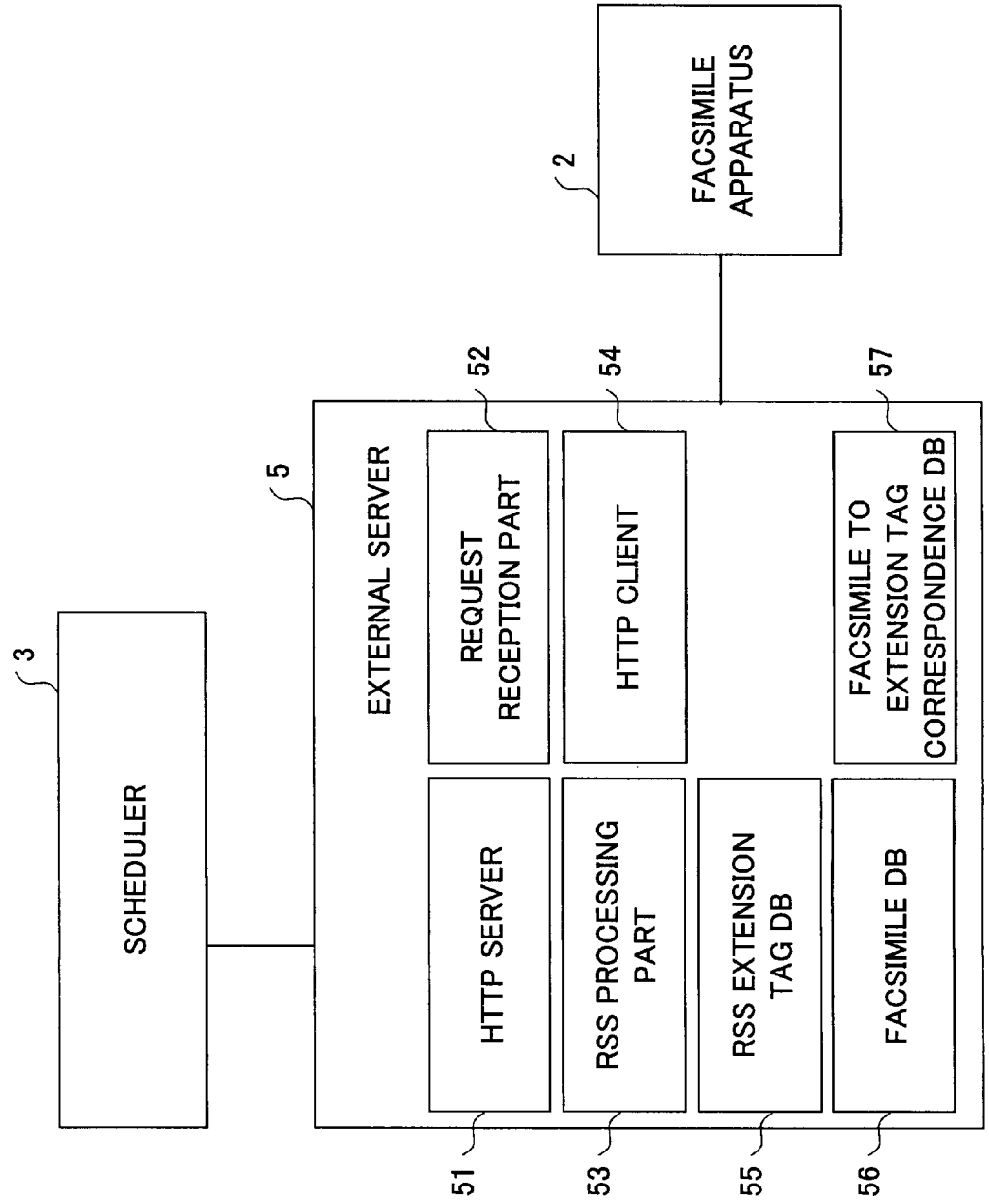

FIG.20

| EXTENSION TAG ID | EXTENSION TAG NAME SPACE | ELEMENT LEVEL | EXTENSION TAG NAME | VARIABLE NAME |
|---|---|---|---|---|
| 1 | http://fax.com/xmlns | item | senderNo | <%sender_no%> |
| 2 | http://ricoh.com/fax | item | sender_number | <%sender_no%> |
| 3 | http://fax.com/xmlns | item | faxType | <%fax_type%> |
| 4 | http://example.com/fax | item | faxno | <%sender_no%> |
| 5 | http://example.com/fax | item | faxtype | <%fax_type%> |
| 6 | http://ricoh.com/fax | item | fax_type | <%fax_type%> |

| FACSIMILE ID | RSS URL |
|---|---|
| 1 | http://fax1.server.com/rss |
| 2 | http://fax2.server.com/rss2 |

| FACSIMILE ID | EXTENSION TAG ID |
|---|---|
| 1 | 1 |
| 1 | 3 |
| 2 | 2 |
| 2 | 6 |
| 2 | 7 |

57

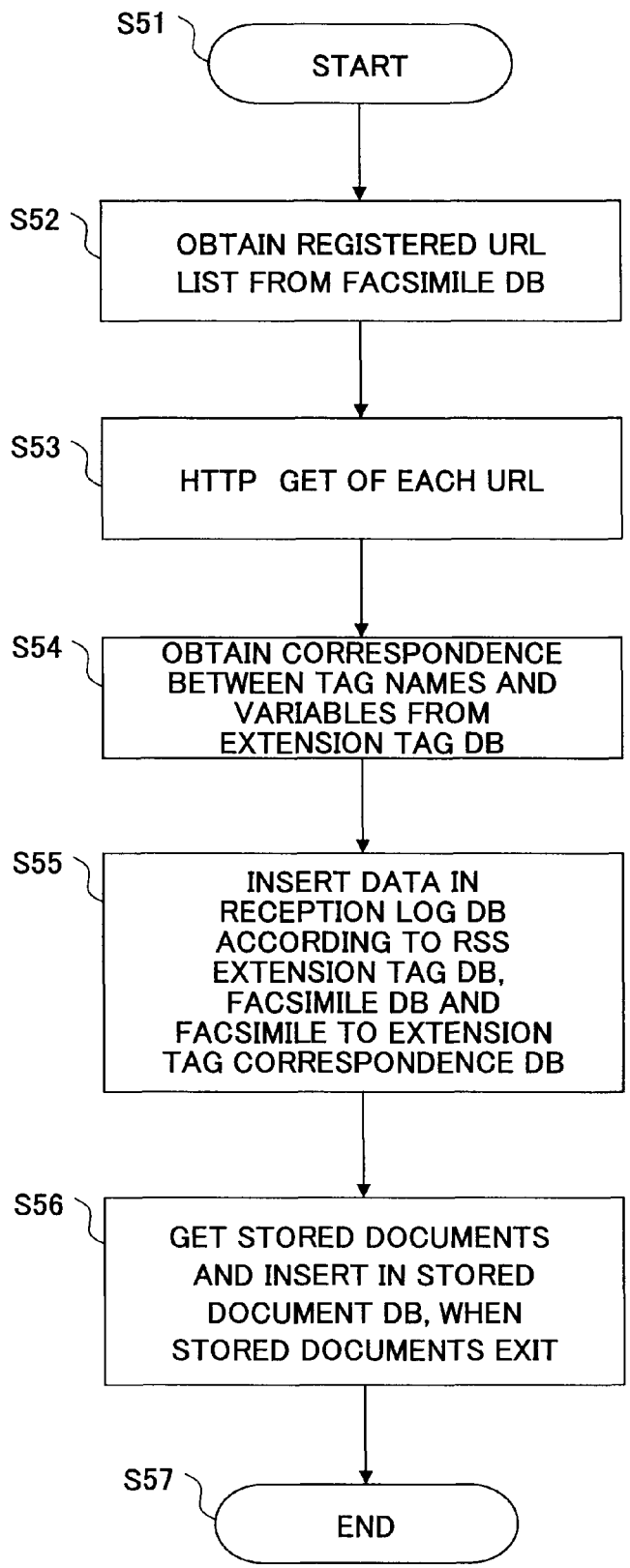

META DATA CUSTOMIZING METHOD

BACKGROUND OF THE INVENTION

1. Field of the Invention

The present invention relates to a meta data customizing method by which a format of meta data described in a structured language such as an RSS (RDF (Resource Description Framework) Site Summary, Rich Site Summary or Really Simple Syndication) or such, can be customized.

2. Description of the Related Art

Recently, a technology using an RSS draws attention, and, a facsimile apparatus or such having a function of storing a facsimile reception image in a predetermined URL (Uniform Resource Locator), and delivering list information including the URL, has been proposed (for example, see Japanese Laid-Open Patent Application 2006-54732).

Further, since an RSS is standardized data of an XML (eXtensible Markup Language), and is advantageous so that handling such as modification or aggregation thereof can be made flexibly, a system may be considered such that a facsimile apparatus having such an RSS delivering function is combined with a scheduler having an RSS reading function, and a facsimile reception history is read from a PC (Personal Computer) or such, as one of schedule management operations.

FIG. 1 shows an example of a system configuration in the related art including a facsimile apparatus having an RSS delivering function. In this system, a scheduler 3 is connected to a facsimile apparatus 2 having the RSS delivering function connected with a transmission source facsimile apparatus by means of a telephone line, and a client 4 such as a PC is connected to the scheduler 3.

FIG. 2 shows an example of an RSS delivered from the facsimile apparatus 2, in which one item of a reception history is included in a description D1 part of an item element, and the number of latest reception histories continue. In the description D1 of item element, a title of the reception history, a link to a received image, date/time, a destination, a line, the number of sheets, a result and so forth, are included.

As described above, by combining the facsimile apparatus 2 having the RSS delivering function and the scheduler 3, it is possible to read the facsimile reception history from the remote client 4, as one of the schedule management operations, whereby user friendliness improves. However, since the RSS delivered by the facsimile apparatus 2 is generated based on a fixed template, a format is fixed, and thus, a problem may occur when displaying is made from the scheduler 3 or so.

FIG. 3 shows one example of displaying from the scheduler 3, in which the contents of the title element (i.e., the 'ABC COMPANY' part of '<title>ABC COMPANY</title>) is displayed together with the time.

However, when a week view in which a part corresponding to one day is defined vertically as shown, all the contents of the title element may not be displayed in a case where the contents of the title element is long, as shown in FIG. 3, (a). In contrast thereto, when a day view in which a part corresponding to one day time zone is defined horizontally, an information amount prepared for displaying may not be filled with the titled element contents in a case where the title element contents are short, as shown in FIG. 3, (b).

FIG. 4 shows another example of displaying from the scheduler 3. In this example, in a case where the title element includes the time as in '<title>10:23 ABC COMPANY</title>' (i.e., such a format may be set since it is convenient that the time is included in the title element in an RSS reader which displays only the contents of the title element), the time is displayed duplicately, as shown, when the scheduler 3 further adds the time to the title element contents.

Thus, a tag of each element and the contents thereof included in the RSS are fixedly determined, a client can do only selection therefrom, and the above-mentioned problem may occur when the fixedly determined ones are not proper. Further, the RSS delivering side cannot determine what should be included in the tag. It is possible that the RSS delivering side prepares a template for RSS generation for each RSS reader of a client. However, since there are innumerable RSS readers, such a way may be unrealistic.

Further, in a case where the RSS includes desired information, it is possible to extract thereof in a certain way. However, when necessary information is lacked, the desired information may not be extracted only by means of customization on the side of a client. For example, in a case where a name of a destination is lacked in the title element, the desired information may not be extracted on the client side.

Furthermore, although customizing with a regular expression or such (i.e., scraping) is available, 100% accuracy may not be expected, and thus, a proper displaying manner may not be achieved consequently. For example, in a case of '<title>2006-01-09 Ricoh Co., Ltd.</title>', it may not be possible to positively determine whether or not the top numerals thereof correspond to date/time, whether or not some character string exists subsequent to the company name, or such.

SUMMARY OF THE INVENTION

The present invention has been devised in consideration of the above-mentioned problems, and an object of the present invention is to provide a meta data customizing method by which a format of meta data described in a structured language can be designated when a request is made from a client, and the meta data can be thus freely customized.

In order to achieve the object, according to the present invention, a meta data customizing method for customizing meta data in a system in which the meta data is delivered from a delivering apparatus having a function to deliver the meta data which is described in a structured language, to a user apparatus, and the meta data is used, includes:

making a meta data obtaining request to the delivering apparatus from the user apparatus, the request comprising designation of an element to customize, which element exists in a predetermined location of a description of the structured language of the meta data to obtain, as well as format designation designating a variable to be located in the element and a format thereof; and every time dynamically replacing the contents of the corresponding element of the description of the structured language of the meta data to output, with a value corresponding to the variable and the format designated by the format designation, based on the designation of the element and the format designation, according to different requests from respective user apparatuses, in the delivering apparatus.

According to another aspect of the present invention, a meta data customizing method for customizing meta data in a system in which the meta data is delivered from a delivering apparatus having a function to deliver the meta data which is described in a structured language, to a user apparatus, and the meta data is used, includes:

an external server, other than the delivering apparatus, collecting the meta data from the delivering apparatus;

the user apparatus making a meta data obtaining request to the external server, the request comprising designation of an element to customize, which element exists in a predetermined location of a description of the structured language of the meta data to obtain, as well as format designation designating a variable to be located in the element and a format thereof; and the external server every time dynamically replacing the contents of the corresponding element of the description of the structured language of the meta data to output, with a value corresponding to the variable and the format designated by the format designation, based on the designation of the element and the format designation, according to different requests from respective user apparatuses.

According to further another aspect of the present invention, a delivering apparatus in a system in which meta data is delivered from the delivering apparatus having a function to deliver the meta data which is described in a structured language, to a user apparatus, and the meta data is used, includes:

a part configured to receive a meta data obtaining request from the user apparatus or an external server, which request comprises designation of an element to customize, which element exists in a predetermined location of a description of the structured language of the meta data to obtain, as well as format designation designating a variable to be located in the element and a format thereof;

a part configured to every time dynamically replace the contents of the corresponding element of the description of the structured language of the meta data to output, with a value corresponding to the variable and the format designated by the format designation, based on the designation of the element and the format designation, according to different requests from respective user apparatuses; and a part configured to return the meta data in which the replacement is thus made, to the request source.

According to further another aspect of the present invention, an external server in a system in which meta data is delivered from a delivering apparatus having a function to deliver the meta data which is described in a structured language, to a user apparatus, and the meta data is used, includes:

a part configured to collect the meta data from the delivering apparatus;

a part configured to receive a meta data obtaining request to from the user apparatus, which request comprises designation of an element to customize, which element exists in a predetermined location of a description of the structured language of the meta data to obtain, as well as format designation designating a variable to be located in the element and a format thereof;

a part configured to every time dynamically replace the contents of the corresponding element of the description of the structured language of the meta data to output, with a value corresponding to the variable and the format designated by the format designation, based on the designation of the element and the format designation, according to different requests from respective user apparatuses; and a part configured to return the meta data in which the replacement is thus made, to the request source.

In the present invention, a format of meta data described in a structured language can be designated when a request is made from a client, and the meta data can be thus freely customized. As a result, it is possible to deliver the meta data which meets the particular needs of the user.

BRIEF DESCRIPTION OF DRAWINGS

Other objects and further features of the present invention will become more apparent from the following detailed description when read in conjunction with the accompanying drawings:

FIG. 1 shows an example of a system configuration including a facsimile apparatus having an RSS delivering function in the related art;

FIG. 2 shows an example of an RSS;

FIGS. 3 and 4 show examples of displaying from a scheduler;

FIG. 7 shows an example of a reception log DB;

FIG. 8 shows an example of a stored document DB;

FIG. 9 shows an example of a template;

FIG. 15 shows an example of a request from the scheduler to the facsimile apparatus;

FIG. 18 shows an example of a system configuration according to a fourth embodiment of the present invention;

FIG. 19 shows an example of a configuration of an external server;

FIG. 20 shows an example of an RSS extension tag DB;

FIG. 21 shows an example of a facsimile DB;

FIG. 22 shows an example of a facsimile to extension tag correspondence DB;

FIG. 28 shows a flow chart of an example of processing of an RSS crawler and an RSS processing part.

DETAILED DESCRIPTION OF THE PREFERRED EMBODIMENTS

Figure 5:
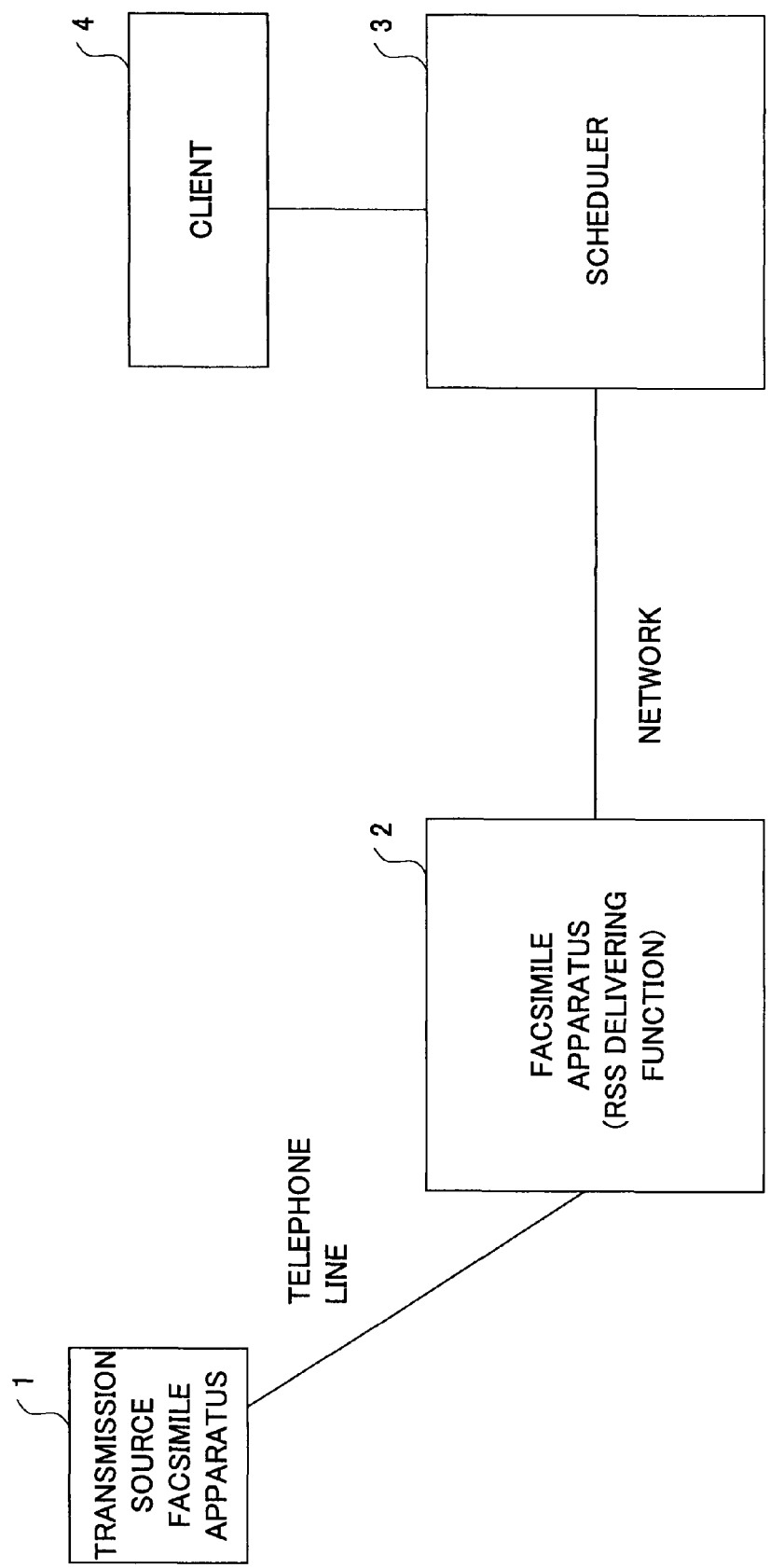
FIG. 5 shows an example of a system configuration according to a first embodiment of the present invention.

According to an embodiment of the present invention, a meta data customizing method for customizing meta data in a system in which the meta data is delivered from a delivering apparatus having a function to deliver the meta data which is described in a structured language, to a user apparatus, and the meta data is used, includes:

making a meta data obtaining request to the delivering apparatus from the user apparatus, the request comprising designation of an element to customize, which element exists in a predetermined location of a description of the structured language of the meta data to obtain, as well as format designation designating a variable to be located in the element and a format thereof; and every time dynamically replacing the contents of the corresponding element of the description of the structured language of the meta data to output, with a value corresponding to the variable and the format designated by the format designation, based on the designation of the element and the format designation, according to different requests from of respective user apparatuses, in the delivering apparatus.

The meta data customizing method may further include:
holding a template for generating the meta data; and
temporarily replacing the contents of the corresponding element of the description of the structured language designated by the meta data obtaining request, in the template, with the variable and the format designated by the format designation.

The meta data customizing method may further include:
holding a plurality of the templates; and
including, in the meta data obtaining request, a description to designate one of the plurality of templates.

The meta data customizing method may further include:
replacing the contents of the corresponding element of the description of the structured language designated by the meta data obtaining request, in the meta data, with the contents of another element corresponding to the designated format.

The meta data customizing method may further include:
replacing the contents of the corresponding element of the description of the structured language designated by the meta data obtaining request, in the meta data, with the contents of an extension tag corresponding to the variable of the format designation of the meta data obtaining request.

The meta data customizing method may further include:
designating the element in the meta data obtaining request by a relative position from a predetermined element.

According to another embodiment of the present invention, a meta data customizing method for customizing meta data in a system in which the meta data is delivered from a delivering apparatus having a function to deliver the meta data which is described in a structured language, to a user apparatus, and the meta data is used, includes:
an external server other than the delivering apparatus, collecting the meta data from the delivering apparatus;
the user apparatus making a meta data obtaining request to the external server, the request comprising designation of an element to customize, which element exists in a predetermined location of a description of the structured language of the meta data to obtain, as well as format designation designating a variable to be located in the element and a format thereof; and
the external server every time dynamically replacing the contents of the corresponding element of the description of the structured language of the meta data to output, with a value corresponding to the variable and the format designated by the format designation, based on the designation of the element and the format designation, according to different requests from respective user apparatuses.

The meta data customizing method may further include:
the external server previously collecting the meta data from a plurality of the delivering apparatuses.

According to further another embodiment of the present invention, a delivering apparatus in a system in which meta data is delivered from the delivering apparatus having a function to deliver the meta data which is described in a structured language, to a user apparatus, and the meta data is used, includes:
a part configured to receive a meta data obtaining request from the user apparatus or an external server, which request comprises designation of an element to customize, which element exists in a predetermined location of a description of the structured language of the meta data to obtain, as well as format designation designating a variable to be located in the element and a format thereof;
a part configured to every time dynamically replace the contents of the corresponding element of the description of the structured language of the meta data to output, with a value corresponding to the variable and the format designated by the format designation, based on the designation of the element and the format designation, according to different requests from respective user apparatuses; and
a part configured to return the meta data in which the replacement is thus made, to the request source.

According to further another embodiment of the present invention, an external server in a system in which meta data is delivered from a delivering apparatus having a function to deliver the meta data which is described in a structured language, to a user apparatus, and the meta data is used, includes:
a part configured to collect the meta data from the delivering apparatus;
a part configured to receive a meta data obtaining request to from the user apparatus, which request comprises designation of an element to customize, which element exists in a predetermined location of a description of the structured language of the meta data to obtain, as well as format designation designating a variable to be located in the element and a format thereof;
a part configured to every time dynamically replace the contents of the corresponding element of the description of the structured language of the meta data to output, with a value corresponding to the variable and the format designated by the format designation, based on the designation of the element and the format designation, according to different requests from respective user apparatuses; and
a part configured to return the meta data in which the replacement is thus made, to the request source.

In the embodiments of the present invention, a format of meta data described in a structured language can be designated when a request is made from a client, and the meta data can be thus freely customized. As a result, it is possible to deliver the meta data which meets particular needs of the user.

Next, preferred embodiments of the present invention will be described with reference to figures.

First Embodiment

FIG. 5 shows an example of a system configuration according to a first embodiment of the present invention.

In FIG. 5, a scheduler 3 is connected to a facsimile apparatus 2 by means of a communication network, which facsimile apparatus 2 has an RSS delivering function and is connected with a facsimile apparatus 1 which is a transmission source by means of a telephone line. A client 4 such as a PC is connected to the scheduler 3.

Figure 6:
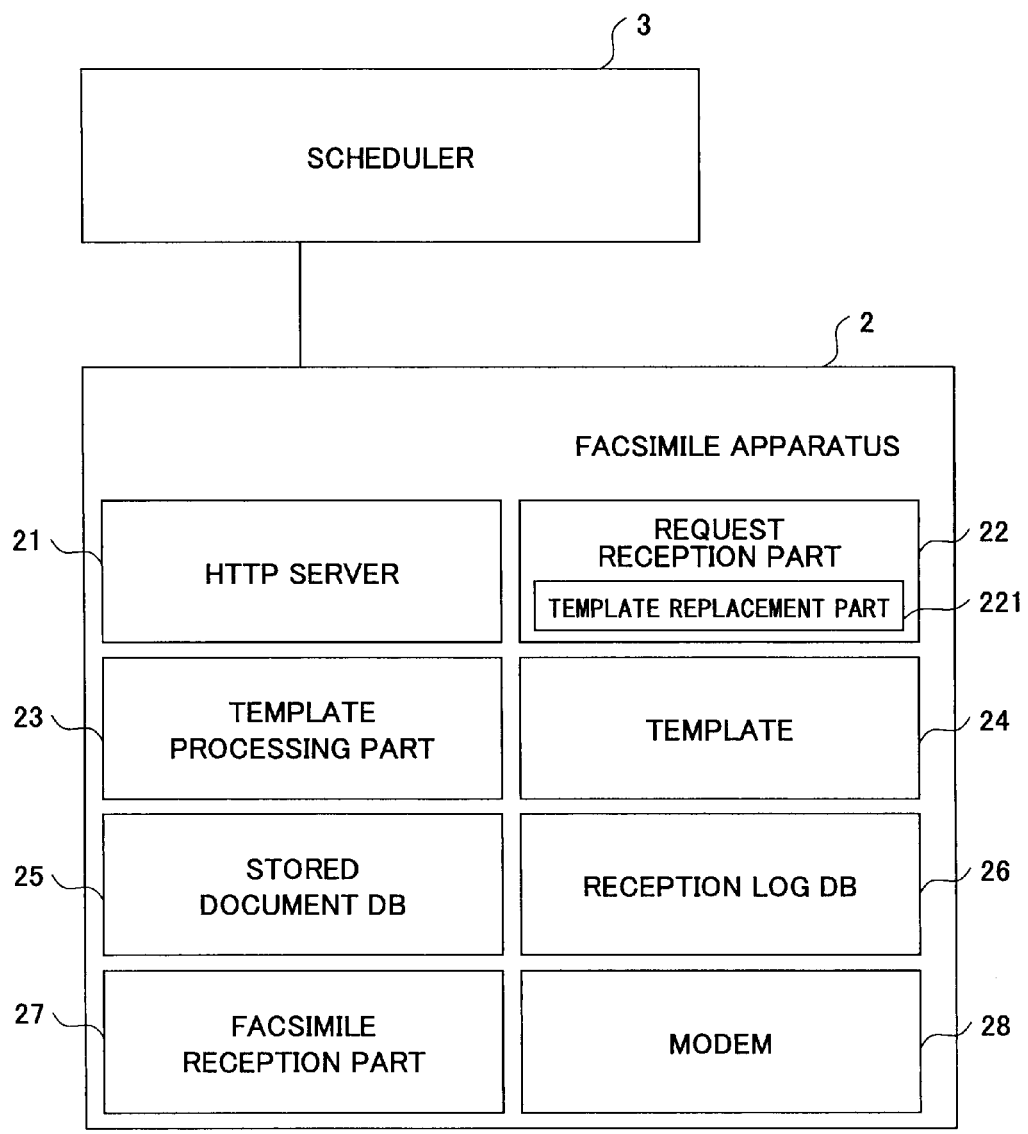
FIG. 6 shows an example of a configuration of a facsimile apparatus.

FIG. 6 shows an example of a configuration of the facsimile apparatus 2, which includes an HTTP sever 21 which provides an HTTP (Hyper Text Transfer Protocol) service (i.e., receiving a request and returning a predetermined response) to the scheduler 3, a request reception part 22 which receives a request issued by the scheduler 3, and carries out predetermined processing, a template 24 which is used as a form to generate an RSS, and a template processing part 23 which generates an RSS based on the template 24 which is modified by the request reception part 22. The request reception part 22 includes a template replacement part 221 which replaces a description in the template 24 based on a format designated when a request is made.

In the facsimile apparatus 2, a modem 28 providing an interface with the telephone line, a facsimile reception part 27 carries out facsimile reception from the transmission source facsimile apparatus 1, a stored document DB 25 storing facsimile reception images and a reception log DB 26 storing a reception log.

FIG. 7 shows an example of the reception log DB 26, which includes items of a 'transmission source' indicating information of a telephone number of a transmission source or such, a 'type' indicating a facsimile mode and so forth, the 'number of pages' indicating the number of received pages, and a 'document ID' identifying a corresponding stored document stored in the stored document DB 25.

FIG. 8 shows an example of the stored document DB 25, which includes items of a 'document ID' identifying each stored document, and a 'file' indicating a file name (including a file path) of each stored document.

FIG. 9 shows an example of the template 25, which corresponds to the RSS shown in FIG. 2. in FIG. 9, variables are described in parts in which respective elements are included. For example, as to a title element, a variable indicating a transmission source, i.e., '<%-sender_no%>', is described together with characters of 'FACSIMILE RECEPTION:'. When an RSS is actually generated, these variables are replaced by specific character strings by means of processing of the template processing part 23, and thus, an RSS in which replacement is thus made is generated.

Figure 10:
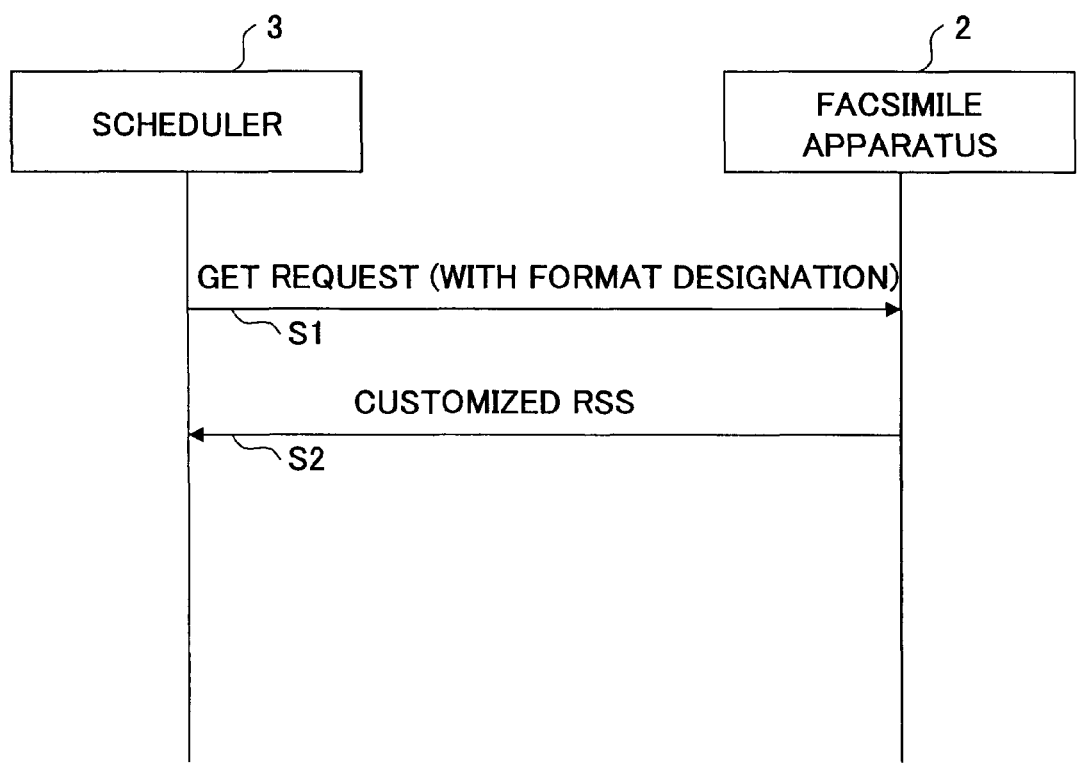
FIG. 10 shows an example of communication between the scheduler and the facsimile apparatus.

FIG. 10 shows an example of communication between the scheduler 3 and the facsimile apparatus 2.

In FIG. 10, when the scheduler 3 transmits a GET request to obtain an RSS, together with format designation, to the facsimile apparatus 2 (Step S1), the facsimile apparatus 2 generates an RSS in which customization is made according to the format designation, and transmits it to the scheduler 3 as a response (Step S3).

Figure 11:
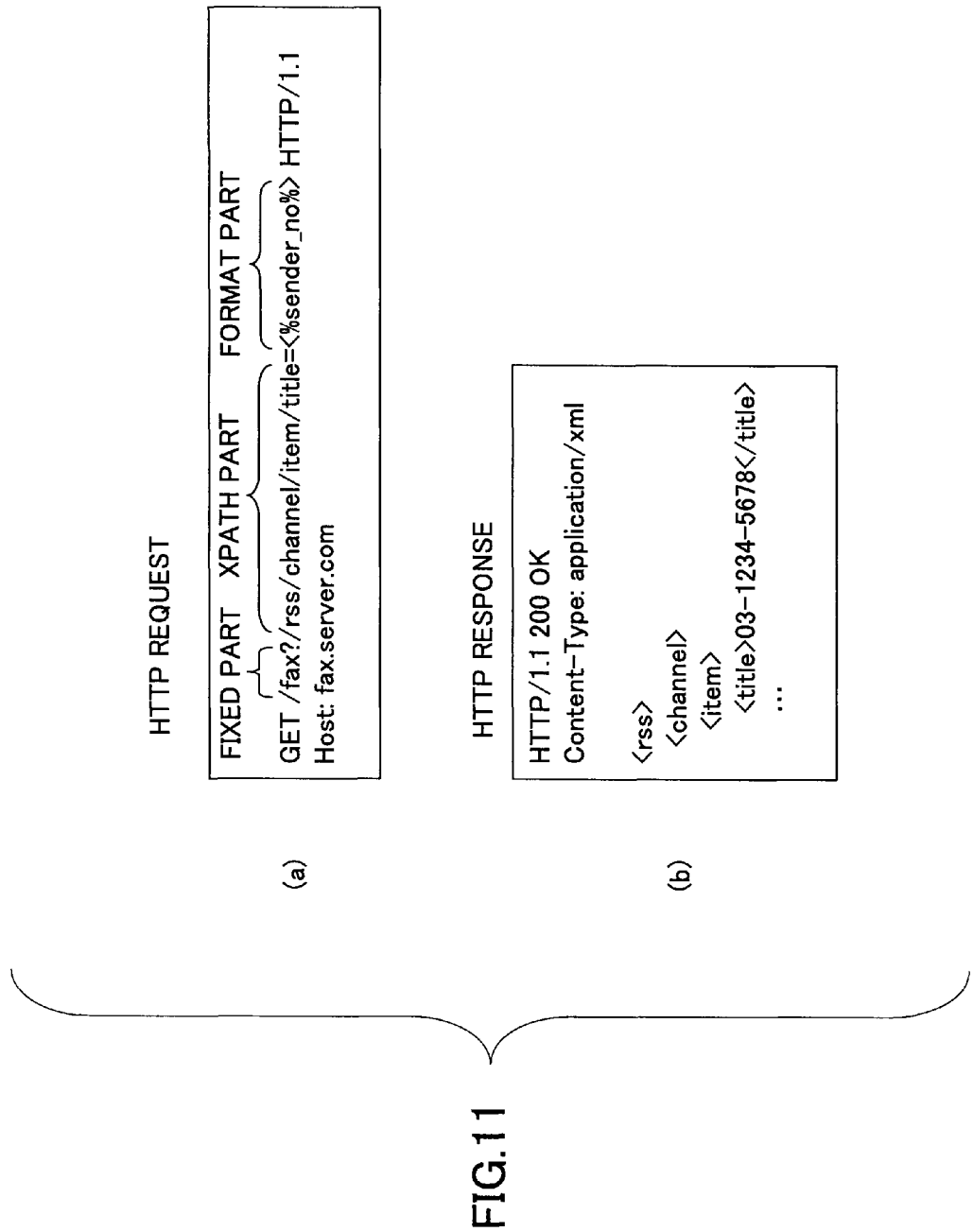
FIG. 11 shows an example of a request and a response between the scheduler and the facsimile apparatus.

FIG. 11 shows an example of a request and a response between the scheduler 3 and the facsimile apparatus 2.

FIG. 11 (a) shows an example of an HTTP request transmitted from the scheduler 3 to the facsimile apparatus 2. In this example, subsequent to 'GET', a fixed part such as '/fax' indicating to obtain a facsimile reception history, an XPath part such as '/rss/channel/item/title' designating an element of an RSS to customize, and a format part such as '<%sender_no%>' designating a format of the designated element, are included. It is noted that, instead of describing the fixed part, the XPath part and the format part as parameters of the request, the same information may be included in the HTTP header.

FIG. 11 (b) shows an example of a response returned from the facsimile apparatus 2 to the scheduler 3. It is noted that, originally, a part of a title element of a default template is set as '<title>FACSIMILE RECEPTION: <%-sender_no%></title>'. This setting, as the default as it is, will result in '<title>FACSIMILE RECEPTION: 03-1234-5678</title>', when the telephone number of the transmission source is '03-1234-5678'. However, as a result of the format designation described above with reference to FIG. 11 (a), the part of the title element of the template is replaced with '<title><%ˆsender_no%></title>', and as a result, '<title>03-1234-5678</title>' is obtained. That is, 'FACSIMILE RECEPTION' is removed, by means of the format designation.

Figure 12:
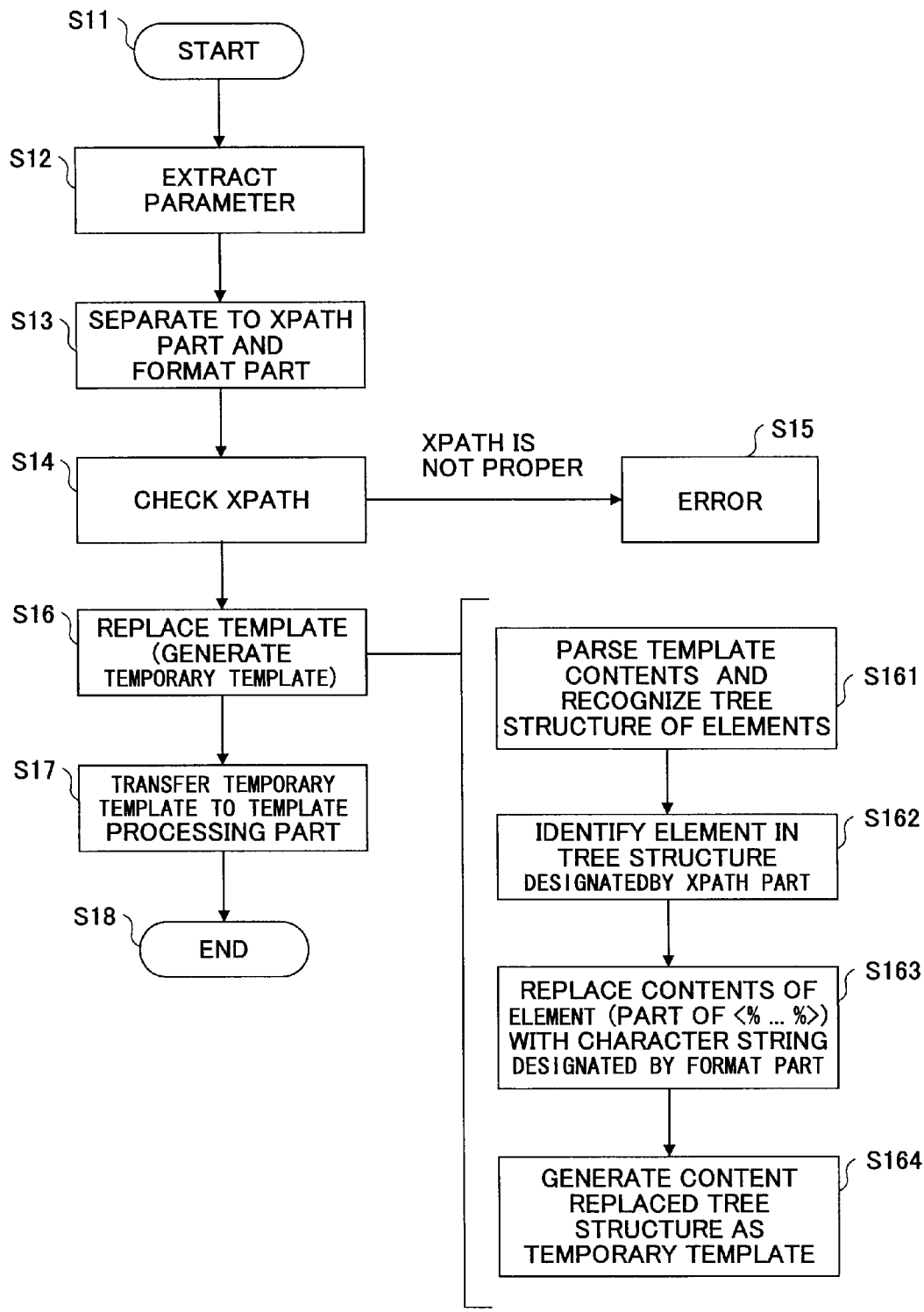
FIG. 12 shows a flow chart of an example of processing of a request reception part.

FIG. 12 shows a flow chart of an example of processing of the request reception part 22.

In FIG. 12, when the request reception part 22 receives a request accompanied by format designation from the scheduler 3 and starts processing (Step S11), the request reception part 22 extracts a parameter from the request (i.e., as shown in FIG. 11 (a)) (Step S12), and separates it into the XPath part and format part (Step S13).

Next, the XPath part is checked (Step S14), and, when the XPath part is not a proper one (for example, in a case where it indicates an element which does not actually exist), a determination of error is made (Step S15).

When the XPath part is a proper one, the template replacement part 221 replaces a designated element part of the template 24 according to designation of the XPath part and the format part, and generates a temporary template (Step S16), transfers the thus-replaced temporary template to the template processing part 23 (Step S17), and finishes the processing (Step S18).

The template replacement processing (Step S16) made by the template replacement part 221 is carried out as follows:

First, the template replacement part 221 parses (i.e., analyzes) the contents of the template 24, and recognizes a tree structure of the elements thereof (Step S161).

Next, the element is identified by the XPath part (i.e., XPath part separated in Step S13) from the tree structure (Step S162).

Next, the thus-identified contents (i.e., the part of <% . . . %>) are replaced by a character string designated by the format part (i.e., the format part separated in Step S13) (Step S163).

The contents of the tree structure in which the contents are thus replaced are used to generate the temporary template (Step S164).

After that, the template processing part 23 generates an RSS according to the transferred temporary template having the contents thus replaced, and the http server 21 transmits the RSS to the scheduler 3.

Second Embodiment

Figure 13:
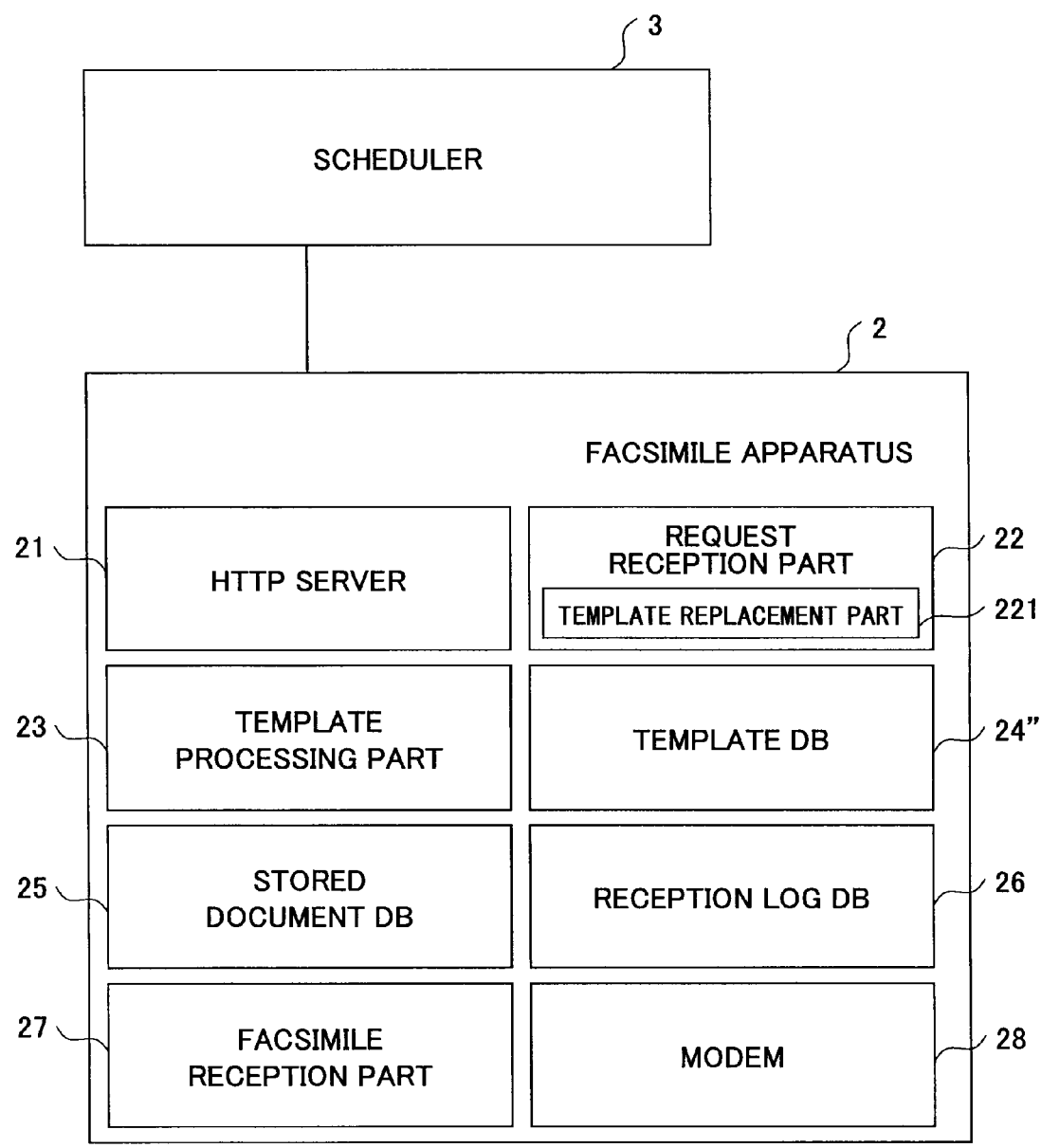
FIG. 13 shows an example of a configuration of a facsimile apparatus according to a second embodiment of the present invention.

FIG. 13 shows an example of a configuration of a facsimile apparatus 2 according to a second embodiment of the present invention.

In FIG. 13, instead of the template 24 of FIG. 6, a template DB 24" holding a plurality of templates is provided. The other configuration is the same as that of FIG. 6.

Figure 14:
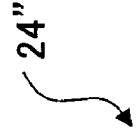
FIG. 14 shows an example of a template DB.

FIG. 14 shows an example of the template DB 24", which includes items of a 'template ID' identifying each template, and a 'template' indicating the contents of the template. In the item of the 'template', a plurality of templates (in each of which setting is changed particularly), the same as that shown in FIG. 9, are held.

FIG. 15 shows an example of a request transmitted from the scheduler 3 to the facsimile apparatus 2. In this example, subsequent to 'GET', a fixed part such as '/fax' indicating to obtain a facsimile reception history, a template ID part such as 'template-ID=2' or such designating a template to use, an XPath part such as '/rss/channel/item/title' designating an element of an RSS to customize, and a format part such as '<% sender_no%>' designating a format of the designated element, are included. It is noted that, instead of describing the fixed part, the template ID part, the XPath part and the format part as parameters of the request, the same information may be included in the HTTP header.

Figure 16:
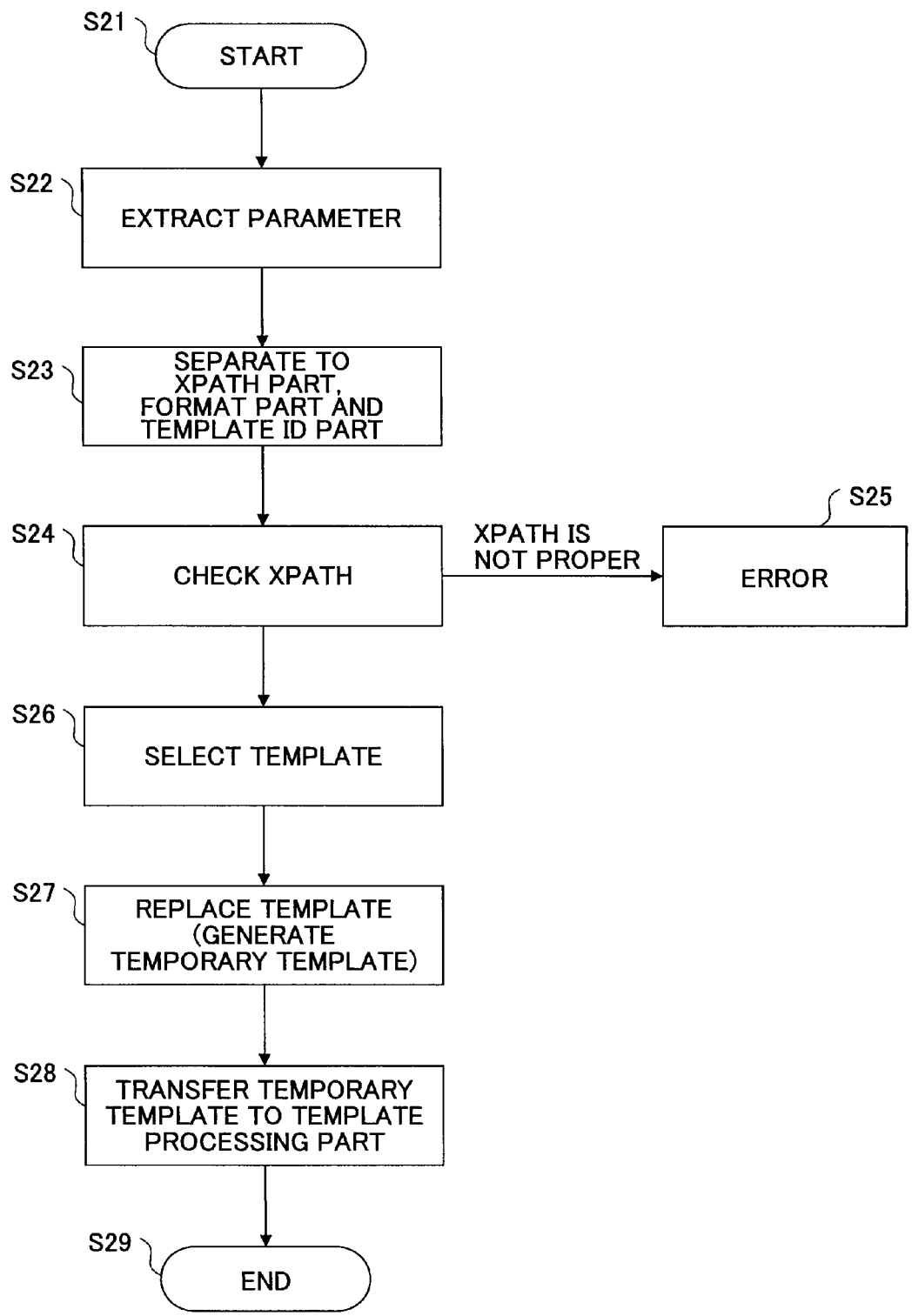
FIG. 16 shows a flow chart of an example of processing of a request reception part.

FIG. 16 shows a flow chart of an example of processing of the request reception part 22.

In FIG. 16, when the request reception part 22 receives a request accompanied by format designation from the scheduler 3 and starts processing (Step S21), the request reception part 22 extracts a parameter from the request (i.e., as shown in FIG. 15) (Step S22), and separates it into the template ID part, the XPath part and the format part (Step S23).

Next, the XPath part is checked (Step S24), and, when the XPath part is not a proper one, a determination of error is made (Step S25).

When the XPath part is a proper one, a template is selected from the template DB 24" according to the designation of the template ID part (Step S26), replacement of designated element parts of the selected template is carried out according to designation of the XPath part and the format part, a temporary template is thus generated (Step S27), the thus-generated temporary template having undergone the replacement is transferred to the template processing part 23 (Step S28), and the processing is finished (Step S29).

After that, the template processing part 23 generates an RSS according to the transferred temporary template having the contents thus replaced, and the HTTP server 21 transmits the RSS to the scheduler 3.

Thus, according to the second embodiment, some basic templates are prepared in the template DB 24", one thereof is selected, and the selected one is slightly modified. As a result, it is possible to effectively reduce a complicated customizing operation (i.e., setting of the format part, or such).

Third Embodiment

Figure 17:
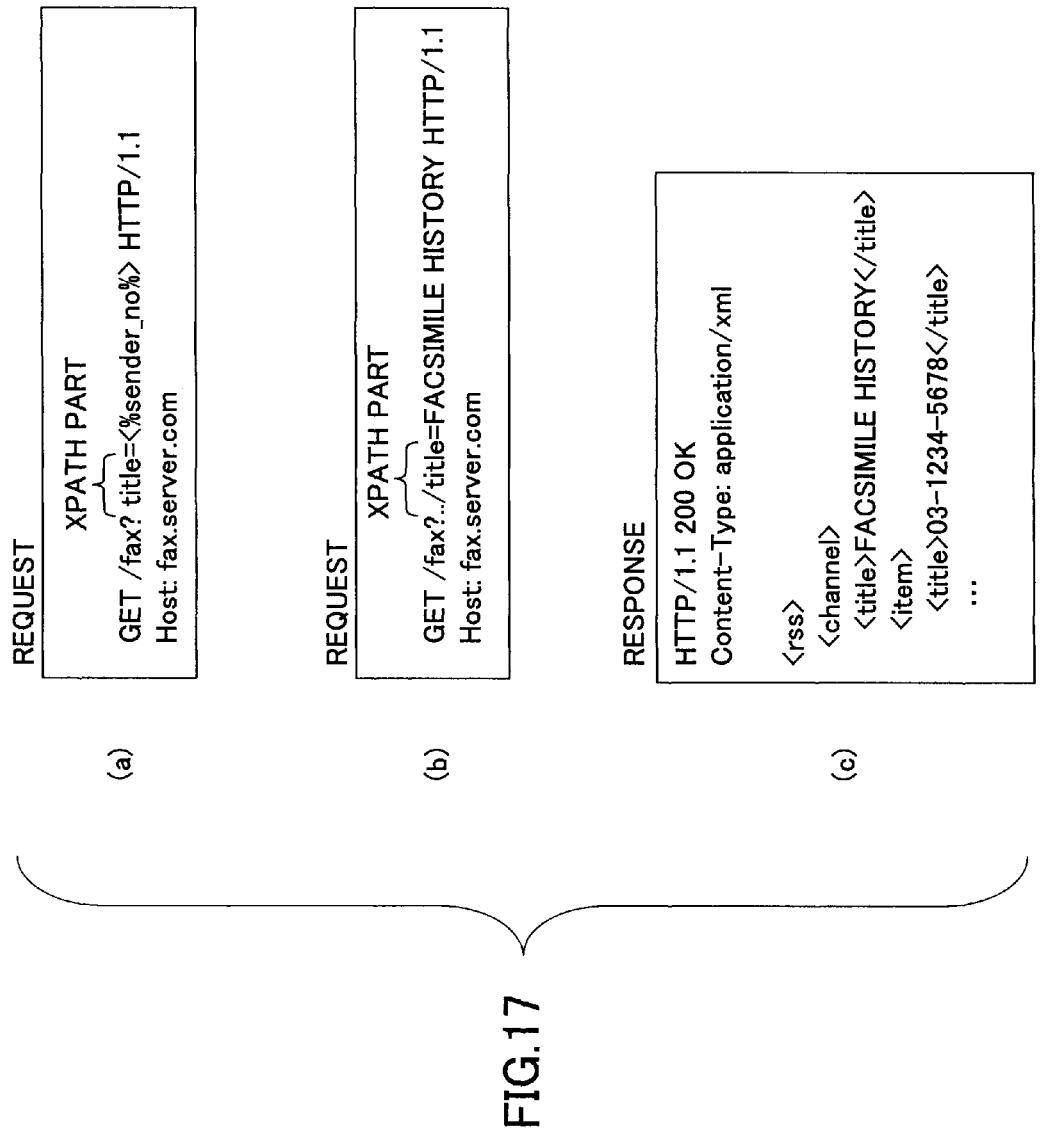
FIG. 17 shows an example of a request and a response according to a third embodiment of the present invention.

FIG. 17 shows an example of a request and a response according to a third embodiment of the present invention. In the third embodiment, a method of interpretation of the XPath part of a request made by the request reception part 22 of FIG. 6 (also, the method of the third embodiment may be applied to the configuration of FIG. 13) is improved.

That is, as shown in FIG. 17 (a), instead of the XPath part being described as '/rss/channel/item/title' as in the case of FIG. 11 (a), a description such as 'title' or such is allowed, i.e., usage of a relative path subsequent to the item element is allowed. Thereby, it is possible to reduce an amount of the customizing operation. It is noted that, instead of describing the XPath part and so forth as parameters of the request, the same information may be included in the HTTP header.

Further, as shown in FIG. 17 (b), by allowing a description of '../' for indicating the channel element, which is one level above the item element, the title element immediately below the channel element can be described as '../title'. Also in this case, instead of describing the XPath part and so forth as parameters of the request, the same information may be included in the HTTP header.

FIG. 17 (c) shows an example of a response customized by the requests shown in FIGS. 17 (a) and 17 (b), in which the title element immediately below the channel element and the title element immediately below the item element are customized.

Fourth Embodiment

FIG. 18 shows an example of a system configuration according to a fourth embodiment of the present invention.

In FIG. 18, the scheduler 3 is not directly connected to the facsimile apparatus 2 but an external server 5 is inserted, and the external server 5 provides the customizing function. Thereby, as the facsimile apparatus 2, a general-purpose facsimile apparatus having an RSS delivering function may be applied. It is noted that, in the facsimile apparatus 2, an RSS extension tag(s), which may be required by the scheduler 3, is(are) previously set.

FIG. 19 shows an example of a configuration of the external server 5, which includes an HTTP server 51 providing an HTTP service (i.e., receiving a request and returning a response) to the scheduler 3, a request reception part 52 receiving a request issued by the scheduler 3, and carrying out predetermined processing, an RSS processing part 53 obtaining an RSS from the facsimile apparatus 2, and an HTTP client 54 for accessing the facsimile apparatus 2.

Further, the external server 5 has an RSS extension tag DB 55 for managing an RSS extension tag defined by the facsimile apparatus 2, a facsimile DB 56 for managing the facsimile apparatus 2 and a facsimile to extension tag correspondence DB 57 for managing the correspondence between the facsimile apparatus 2 and the RSS extension tag.

FIG. 20 shows an example of the RSS extension tag DB 55, which includes items of an 'extension tag ID' for identifying the extension tag, an 'extension tag name space' indicating a location from which a definition of the extension tag is read, an 'element level' indicating a level of the corresponding element, an 'extension tag name' indicating a name of the extension tag, and a 'variable name' indicating the corresponding variable name.

FIG. 21 shows an example of the facsimile DB 56, which includes items of 'facsimile ID' for identifying the facsimile and an 'RSS URL' indicating an URL from which the RSS is obtained.

FIG. 22 shows an example of the facsimile to extension tag correspondence DB 57, which includes items of a 'facsimile ID' for identifying the facsimile, and an 'extension tag ID' for identifying the extension tag.

Figure 23:
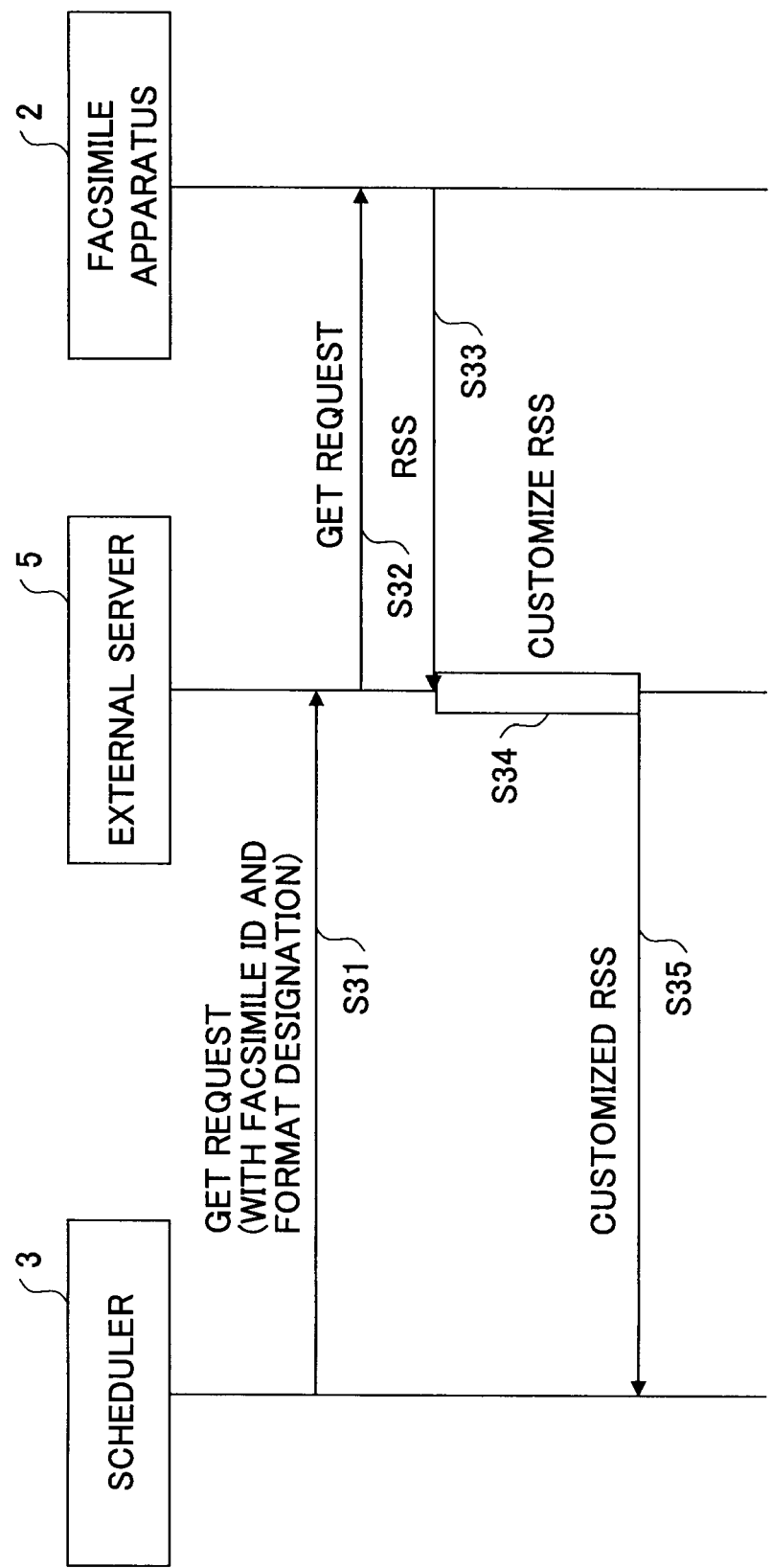
FIG. 23 shows an example of communication among the scheduler, the external server and the facsimile apparatus.

FIG. 23 shows an example of communication between the scheduler 3, the external server 5 and the facsimile apparatus 2.

In FIG. 23, when the scheduler 3 transmits a GET request for obtaining an RSS, together with the facsimile ID and format designation, to the external server 5 (Step S31), the external server 5 transmits a GET request for obtaining an RSS, to the facsimile apparatus 2 (Step S32), and thus, to obtain the RSS from the facsimile apparatus 2 (Step S33).

The external server 5 generates the RSS in which customization is made according to the facsimile ID and the format designation (Step S34), and transmits the RSS as a response to the scheduler 3 (Step S35).

Figure 24:
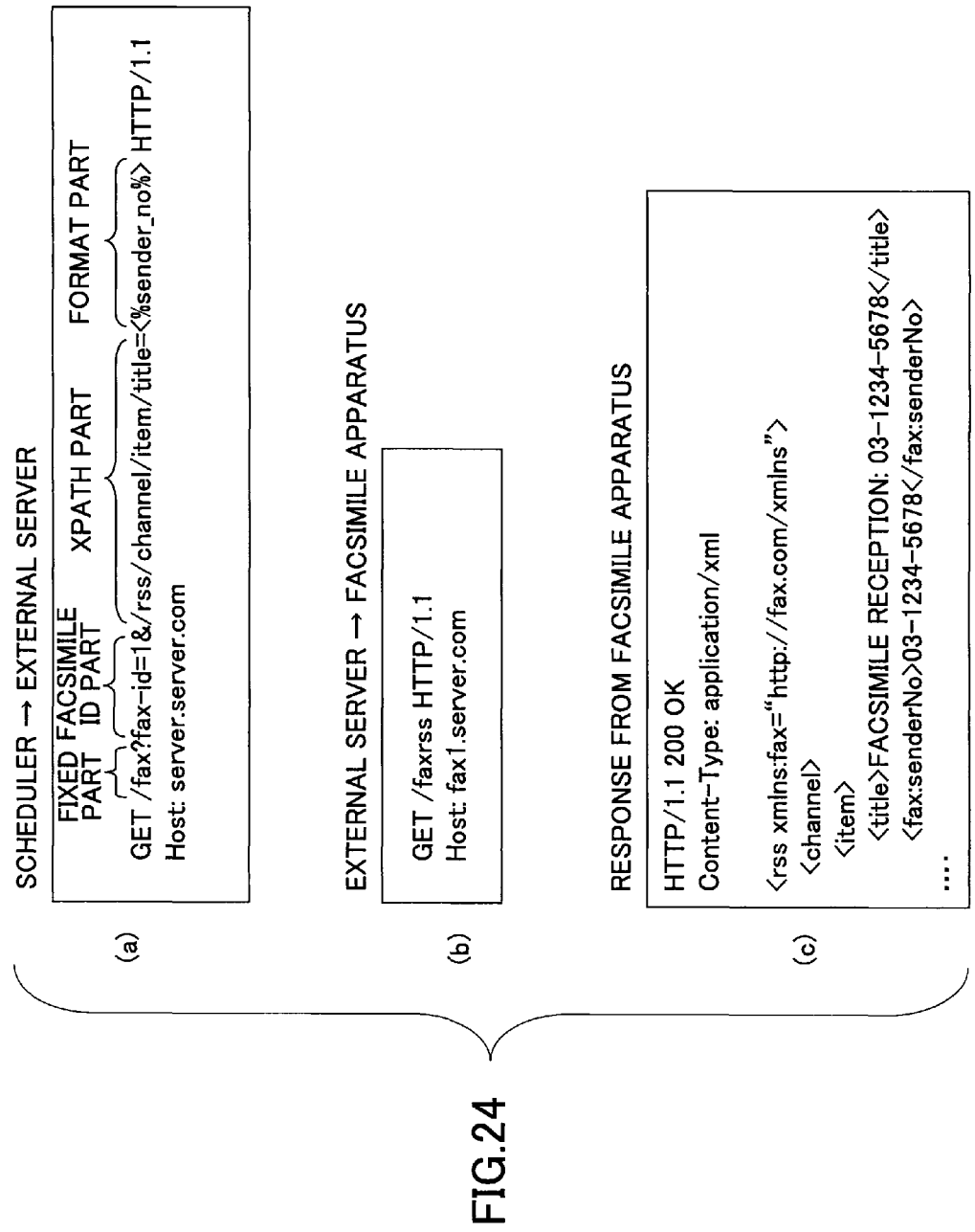
FIG. 24 shows an example of a request and a response among the scheduler, the external server and the facsimile apparatus.

FIG. 24 shows an example of a request and a response between the scheduler 3, the external server 5 and the facsimile apparatus 2.

FIG. 24 (a) shows an example of an HTTP request transmitted to the external server 5 from the scheduler 3, in which, subsequent to 'GET', a fixed part such as '/fax' indicating to obtain a facsimile reception history, a facsimile ID part such as 'fax-id=1' identifying the facsimile apparatus 2, an XPath part such as '/rss/channel/item/title' designating an element of an RSS to customize, and a format part such as '<%sender_no%>' designating a format of the designated element, are included. It is noted that, instead of describing the fixed part, the facsimile ID part, the XPath part and the format part as parameters of the request, the same information may be included in the HTTP header.

FIG. 24 (b) shows an example of an HTTP request transmitted from the external server 5 to the facsimile apparatus 2, which is a common GET request for obtaining an RSS.

FIG. 24 (c) shows an example of a response returned to the external server 5 from the facsimile apparatus 2, which includes an extension tag '<fax:sendorNo>03-1234-5678</fax:sendorNo>' below the item element.

Figure 25:
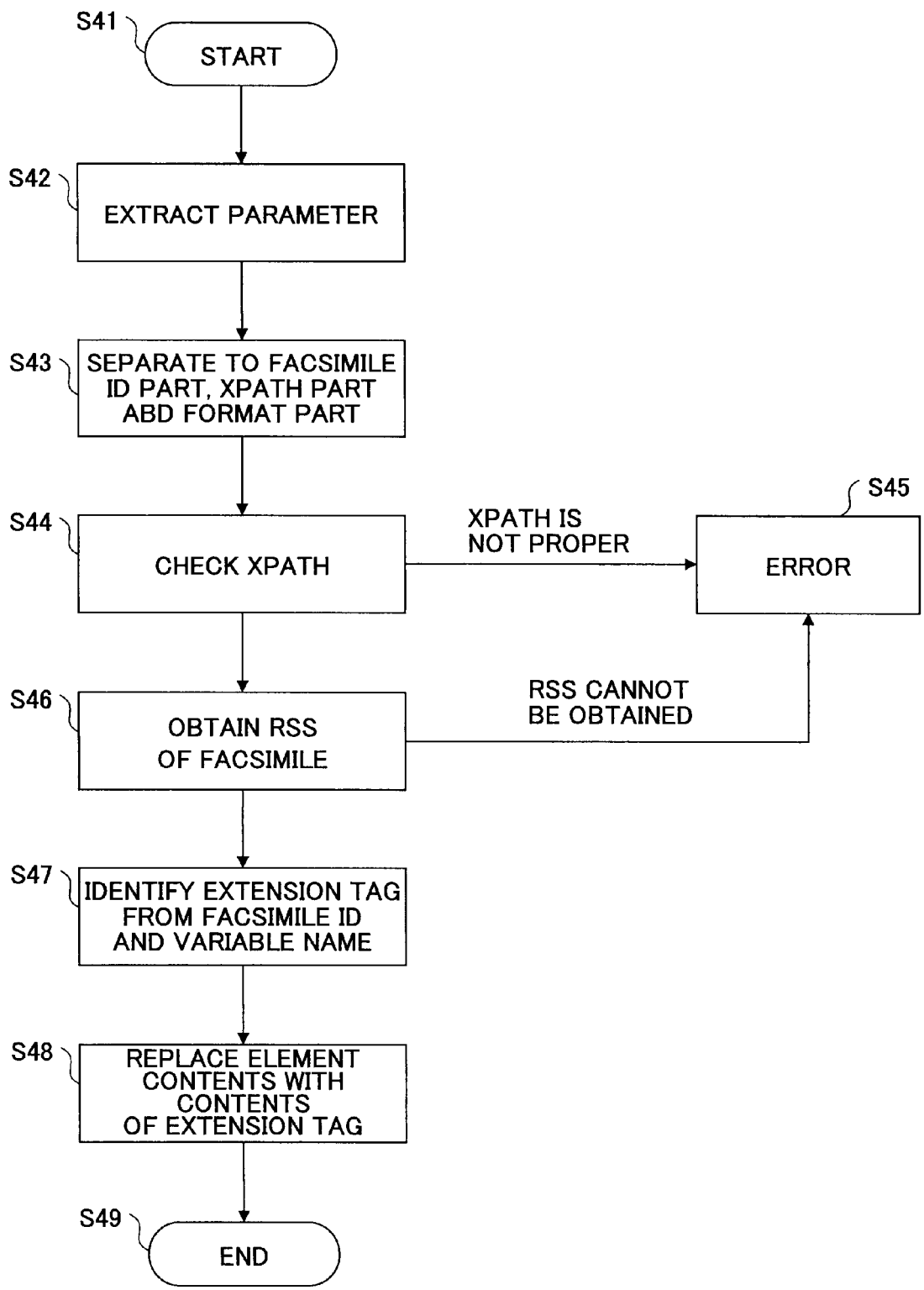
FIG. 25 shows a flow chart of an example of processing of a request reception part.

FIG. 25 shows a flow chart of an example of processing of the request reception part 52.

In FIG. 25, when the request reception part 52 receives a request from the scheduler 3 and starts processing (Step S41), the request reception part 52 extracts a parameter from the request (i.e., as shown in FIG. 24 (a)) (Step S42), and separates it into the facsimile ID part, the XPath part and the format part (Step S53). In the example of FIG. 24 (a), the facsimile ID part has '1' (i.e., the facsimile ID: '1'), the XPath part has '/rss/channel/item/title' and the format part has '<%sendor_no%>'.

Next, the XPath part is checked (Step S44), and, when the XPath part is not a proper one, a determination of error is made (Step S45).

When the XPath part is a proper one, the RSS processing part 53 and the HTTP client 54 issue a request to the facsimile apparatus 2 identified by the facsimile ID part (i.e., identifying the URL, from the facsimile DB 56 of FIG. 21, with the facsimile ID) to obtain an RSS (Step S46). When the RSS cannot be obtained, an error determination is made (Step S45).

When the RSS can be obtained from the facsimile apparatus 2, the respective DBs 55 and 57 (shown in FIGS. 20 and 22) are read, and thus, the extension tag to be used is identified with the above-mentioned facsimile ID and the variable name (Step S47). In the example of FIG. 24 (a), it is seen from the facsimile to extension tag correspondence DB 57 of FIG. 22 that the extension tag IDs '1' and '3' correspond to the facsimile ID '1', and, it is seen from the RSS extension tag DB 55 of FIG. 20 that the extension tag ID '1' (having the extension tag name 'sendorNo') has the same variable name as that of the format part of the request, i.e., '<%sendor_no%>', shown in FIG. 24 (a).

Next, the contents of the element of the above-mentioned RSS are replaced with the contents of the thus-identified extension tag, thus, the RSS are customized (Step S48), and the processing is finished (Step S49). In the example of FIG. 24 (a), the tag ('<fax:sendorNo></fax:sendorNo>'), having the thus-identified extension tag name 'sendorNo', is read from the response shown in FIG. 24 (c), and the contents thereof, i.e., '03-1234-5678' are used to replace the contents of the item element of the RSS indicated by the XPath part '/rss/channel/item/title' of the request shown in FIG. 24 (a).

After that, the HTTP server 51 transmits the RSS in which the replacement is thus made, to the scheduler 3.

Fifth Embodiment

Figure 26:
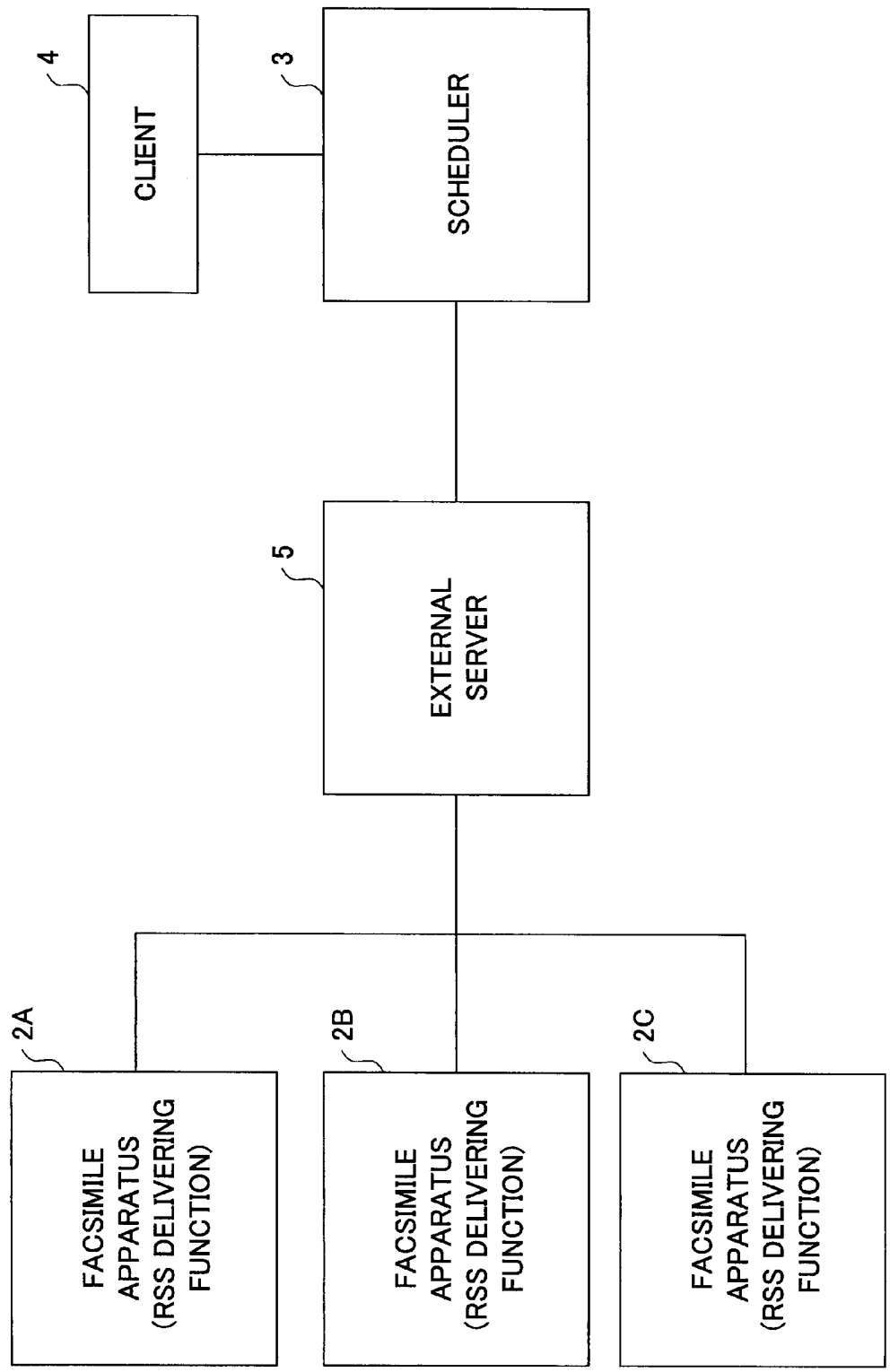
FIG. 26 shows an example of a system configuration according to a fifth embodiment of the present invention.

FIG. 26 shows an example of a system configuration according to a fifth embodiment of the present invention.

In FIG. 26, an external server 5 is inserted between a plurality of facsimile apparatuses 2A through 2C and a scheduler 3, RSSs are previously obtained (crawled) from the plurality of facsimile apparatuses 2A through 2C by the external server 5, and thus, the customized RSS can be rapidly provided to the scheduler 3.

Figure 27:
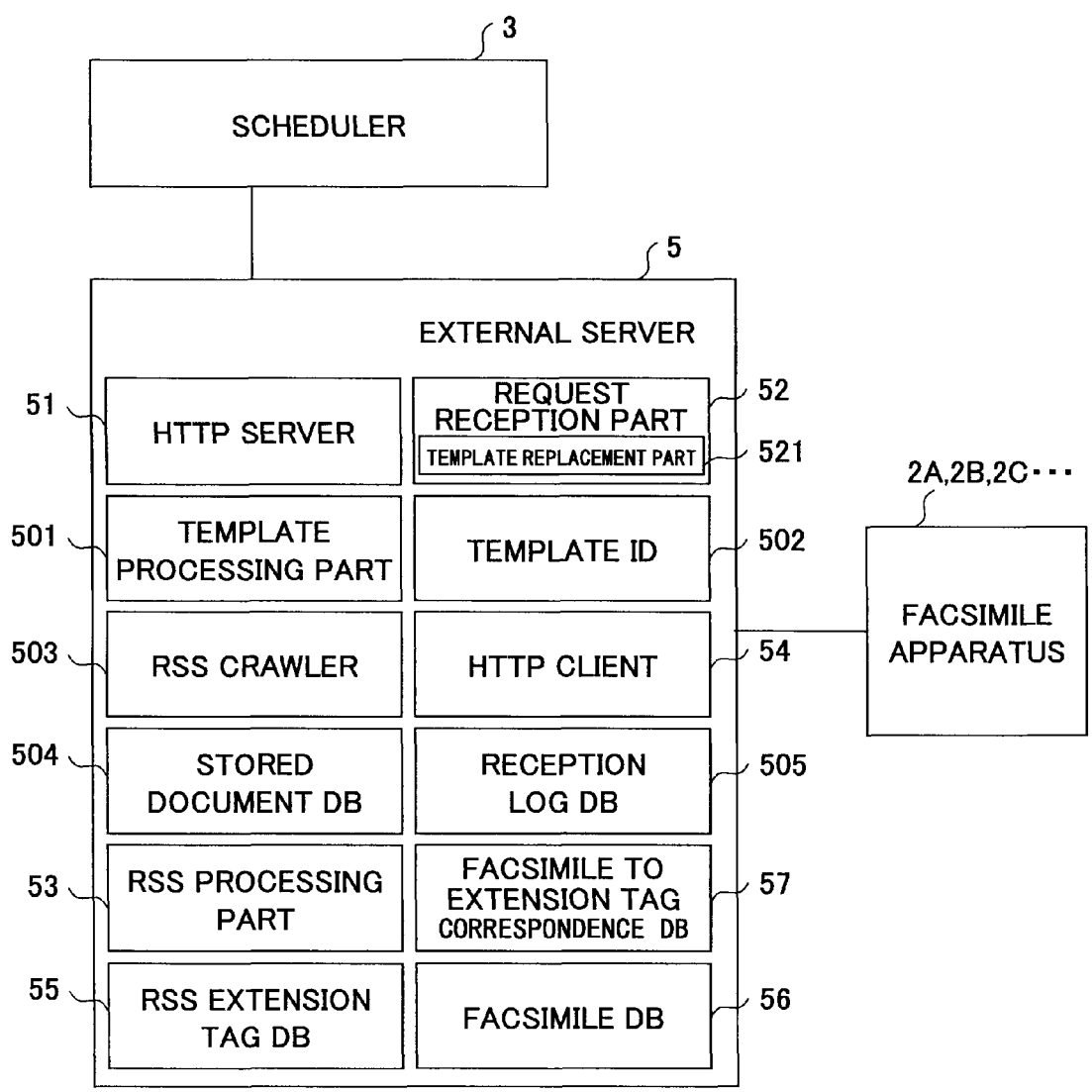
FIG. 27 shows an example of a configuration of an external server.

FIG. 27 shows an example of a configuration of the external server 5.

In FIG. 27, in addition to the configuration shown in FIG. 19 (i.e., the HTTP server 51, the request reception part 52, the RSS processing part 53, the HTTP client 54 and the RSS extension tag DB 55), the external server 5 is provided with a template processing part 501 generating an RSS based on a template, a template DB 502 holding a plurality of templates used as forms for RSS generation, an RSS crawler 503 obtaining RSSs from the plurality of facsimile apparatuses 2A through 2C, a stored document DB 504 storing facsimile reception images, and a reception log DB 505 storing a reception log and RSSs. It is noted that, in the request reception part 52, a template replacement part 521 replacing a description in a template, selected from the template DB 502, based on a format designated when a request is made, is included.

FIG. 28 shows a flow chart of an example of processing of the RSS crawler 503 and the RSS processing part 53.

In FIG. 28, when starting processing in predetermined timing such as at fixed time intervals or such (Step S51), the RSS crawler 503 obtains a list of registered URLs from the facsimile DB 56 (FIG. 21) (Step S52), and obtains RSSs from the facsimile apparatuses 2A through 2C by carrying out HTTP GET operation on the respective URLs (Step S53).

Next, the RSS processing part 53 obtains the correspondence between tag names and variables, from the RSS extension tag DB 55 (FIG. 20) (Step S54), and inserts data in the reception log DB 505 according to the RSS extension tag DB 55, the facsimile DB 56 and the facsimile to extension tag correspondence DB 57 (Step S55). Further, the when there are stored documents, the stored documents are obtained by means of GET operation, and are inserted in the stored document DB 504 (Step S56), and, the processing is finished (Step S57).

An RSS obtaining request made by the scheduler 3 after that is the same as that shown in FIG. 15, and processing carried out in response to the request is the same as that shown in FIG. 16.

SUMMARY

The present invention is not limited to the above-described embodiments, and variations and modifications may be made without departing from the basic concept of the present invention claimed below.

The present application is based on Japanese Priority Applications Nos. 2006-224523 and 2007-187626, filed on Aug. 21, 2006 and Jul. 18, 2007, respectively, the entire contents of which are hereby incorporated herein by reference.

What is claimed is:

1. A meta data customizing method for customizing meta data in a system in which the meta data is delivered from a delivering apparatus having a function to deliver the meta data which is described in a structured language, to a user apparatus, and the meta data is used, comprising:

making a meta data obtaining request to the delivering apparatus from the user apparatus, the request comprising a designation by a relative position from a predetermined element of an element to customize, which element exists in a predetermined location of a description of the structured language of the meta data to be obtained, as well as a format designation designating a variable to be located in the element and a format thereof; and every time dynamically replacing the contents of the corresponding element of the description of the structured language of the meta data to be outputted, with a value corresponding to the variable and the format designated by the format designation, based on the designation of the element and the format designation, according to different requests from respective user apparatuses, in the delivering apparatus.

2. The meta data customizing method as claimed in claim 1, further comprising:

storing a template for generating the meta data; and temporarily replacing the contents of the corresponding element of the description of the structured language designated by the meta data obtaining request, in the template, with the variable and the format designated by the format designation.

3. The meta data customizing method as claimed in claim 1, comprising:
storing a plurality of templates; and
including, in the meta data obtaining request, a description to designate one of the plurality of templates.

4. The meta data customizing method as claimed in claim 1, comprising:
replacing the contents of the corresponding element of the description of the structured language designated by the meta data obtaining request, in the meta data, with the contents of another element corresponding to the designated format.

5. The meta data customizing method as claimed in claim 4, comprising:
replacing the contents of the corresponding element of the description of the structured language designated by the meta data obtaining request, in the meta data, with the contents of an extension tag corresponding to the variable of the format designation of the meta data obtaining request.

6. A meta data customizing method for customizing meta data in a system in which the meta data is delivered from a delivering apparatus having a function to deliver the meta data which is described in a structured language, to a user apparatus, and the meta data is used, comprising:
an external server other than the delivering apparatus, collecting the meta data from the delivering apparatus;
the user apparatus making a meta data obtaining request to the external server, the request comprising a designation by a relative position from a predetermined element of an element to customize, which element exists in a predetermined location of a description of the structured language of the meta data to be obtained, as well as a format designation designating a variable to be located in the element and a format thereof; and
the external server every time dynamically replacing the contents of the corresponding element of the description of the structured language of the meta data to be outputted, with a value corresponding to the variable and the format designated by the format designation, based on the designation of the element and the format designation, according to different requests from respective user apparatuses.

7. The meta data customizing method as claimed in claim 6, comprising:
the external server previously collecting the meta data from a plurality of the delivering apparatuses.

8. A delivering apparatus in a system in which meta data is delivered from the delivering apparatus having a function to deliver the meta data which is described in a structured language, to a user apparatus, and the meta data is used, comprising:
a part configured to receive a meta data obtaining request from the user apparatus or an external server, which request comprises a designation by a relative position from a predetermined element of an element to customize, which element exists in a predetermined location of a description of the structured language of the meta data to be obtained, as well as a format designation designating a variable to be located in the element and a format thereof;
a part configured to every time dynamically replace the contents of the corresponding element of the description of the structured language of the meta data to be outputted, with a value corresponding to the variable and the format designated by the format designation, based on the designation of the element and the format designation, according to different requests from respective user apparatuses; and
a part configured to return the meta data in which the replacement is thus made, to the request source.

* * * * *